United States Patent [19]

Haring et al.

[11] Patent Number: 5,271,949
[45] Date of Patent: Dec. 21, 1993

[54] PROCESS FOR PREPARING A FLAVOR CONCENTRATE

[75] Inventors: Petrus G. Haring, Vlaardingen; Ronald P. Potman, Schiedam, both of Netherlands

[73] Assignee: Van den Bergh Foods Company, Division of Conopco, Inc., Lisle, Ill.

[21] Appl. No.: 948,628

[22] Filed: Sep. 21, 1992

Related U.S. Application Data

[63] Continuation of Ser. No. 762,666, Sep. 18, 1991, abandoned.

[51] Int. Cl.$^5$ ............................................... A23L 1/226
[52] U.S. Cl. ..................................... 426/317; 426/312; 426/533; 426/35
[58] Field of Search .................. 426/533, 35, 317, 312

[56] References Cited

U.S. PATENT DOCUMENTS

| | | | |
|---|---|---|---|
| 1,966,460 | 7/1934 | Otting . | |
| 2,835,503 | 5/1958 | Rusoff . | |
| 4,065,580 | 12/1977 | Feldman et al. | 426/33 |
| 4,094,997 | 6/1978 | Aishima et al. . | |
| 4,571,342 | 2/1986 | DiCicca et al. . | |
| 4,604,290 | 8/1986 | Lee et al. | 426/533 |
| 4,684,532 | 8/1987 | Izzo . | |
| 4,701,335 | 10/1987 | Doornbos et al. . | |
| 4,804,555 | 2/1989 | Marschner et al. . | |
| 4,820,538 | 4/1989 | Schulman et al. | 426/533 |
| 4,832,964 | 5/1989 | Pratt . | |
| 5,043,180 | 8/1991 | Haring et al. | 426/533 |

FOREIGN PATENT DOCUMENTS

| | | |
|---|---|---|
| 0298552 | 1/1989 | European Pat. Off. . |
| 51-106750 | 9/1976 | Japan . |
| 2-156853 | 6/1990 | Japan . |

*Primary Examiner*—Joseph Golian
*Attorney, Agent, or Firm*—Rimma Mitelman

[57] ABSTRACT

The present invention relates to a process for preparing a flavour concentrate, involving the steps of:
(a) mildly oxidising triglyceride fat, and
(b) hydrolysing the triglyceride fat to a degree of hydrolysis exceeding 10%.

It was found that flavour concentrates of improved quality are obtained if prior to or simultaneously with the hydrolysis of triglyceride fat, said fat is mildly oxidised.

8 Claims, No Drawings

PROCESS FOR PREPARING A FLAVOR CONCENTRATE

This is a continuation application of Ser. No. 07/762,666, filed Sep. 18, 1991, now abandoned.

The present invention relates to a process for preparing a flavour concentrate, said process including hydrolysis of triglyceride fat.

The preparation of a flavour concentrate by enzymatically hydrolysing triglyceride fat is known in the art. Furthermore it is known that triglyceride fat can be split by heating it to a high temperature in the presence of water.

We have found that flavour concentrates of improved quality are obtained if prior to or simultaneously with the hydrolysis of triglyceride fat, said fat is mildly oxidised. Accordingly the present is concerned with a process for preparing a flavour concentrate, involving the steps of:
(a) mildly oxidising triglyceride fat, and
(b) hydrolysing the triglyceride fat to a degree of hydrolysis exceeding 10%.

By the degree of hydrolysis, whenever referred to in this document, is meant the ratio of the Acid Value and the Saponifaction Value of the hydrolysed triglyceride fat.

The hydrolysis of triglyceride fat in the present process can suitably be carried out by maintaining the fat in the presence of water at increased temperature and/or pressure during a period of time sufficient to obtain a degree of hydrolysis exceeding 10%. Alternatively the latter degree of hydrolysis can be obtained at a substantially lower temperature by means of enzymic hydrolysis.

The flavour concentrate obtained by the present process, when compared to a flavour concentrate obtained non-oxidised triglyceride fat, has a less pungent, more rounded off flavour. We have found that the flavour concentrate obtained by the present process when included in a food product at a very low concentration level, imparts a significantly better, particularly a more rounded off flavour to said food product than does the flavour concentrate obtained with non-oxidised fat.

The preparation of a butter flavour concentrate through mild oxidation of butterfat is known from European Patent Application 298.522. Said application particularly relates to a process for preparing a flavoured food product by adding to edible material at least 0.05% (w/w) oxidised butterfat having an n-pentanal content of more than 0.5 ppm and/or a 2-trans-nonenal content of more than 0.05, preferably more than 0.1 ppm.

European Patent Application 136.428 is concerned with a process for preparing a flavorant for imparting a cooked meat or fish flavor to foodstuffs which comprises combining a lipid material being at least one of a triglyceride and an unsaturated fatty acid with a sulfur-containing compound heating the mixture so obtained, wherein before or during the heating the lipid material is oxidised. It is disclosed in EP-A-136.428 to use protease hydrolysed meat and to heat to 100° C. for several hours.

Examples of enzymes which can suitably be used to hydrolyse the triglyceride fat are: lipases and particular proteases. The enzymes used in accordance with the present process to hydrolyse the triglyceride fat, preferably have a specific activity of at least 300, more preferably at least 800 units per mg purified enzyme (1 unit of enzyme releases 1 micromole of fatty acid per minute from triacylglycerol). Enzymic hydrolysis is preferably carried out in an aqueous system having a pH in the range of 5 to 9. According to another preferred embodiment the enzymic hydrolysis is effected a temperature in the range of 20°–45° C.

According to a very preferred embodiment of the present invention hydrolysis of the triglyceride fat is effected by maintaining the fat in the presence of water at increased temperature and/or pressure during a period of time sufficient to obtain a degree of hydrolysis exceeding 10%. As compared to the enzymic hydrolysis of the triglyceride fat, the latter type of hydrolysis offers the advantage that additional flavour components are formed. The latter observation is believed to be the result of the production of intermediate components during mild oxidation, which components during heat hydrolysis are converted to flavour compounds which contribute beneficially to the flavour of the concentrate thereby obtained.

According to a preferred embodiment of the invention, step (a) involves oxidising the fat to such a degree that the ratio of the anisidine value and the iodine value obtained exceeds 0.05. More preferably the ratio of the anisidine value and the iodine value of the oxidised fat exceeds 0.1. Most preferably the fat is oxidised to such a degree that the latter ratio exceeds 0.2.

A suitable way to measure the anisidine value is described in IUPAC, Standard Methods for the Analysis of Oils, Fats and Derivatives, 6th Ed. (1979), Pergamon Press, Oxford, Method 2,504, page 143. The ratio of the anisidine value and the iodine value of an oxidised fat gives a good indication of the degree of oxidation that fat has been subjected to. If solely the anisidine value is relied upon, fats containing high levels of saturated fatty acid residues, will yield relatively low anisidine values, even if such fat is oxidised to a relatively high degree.

As the present process aims at the mild oxidation of fat, the ratio of the peroxide value and the iodine value of the oxidised fat obtained in step (a) should preferably be less than 5, more preferably be less than 1. Generally the ratio of the peroxide value and iodine value of the oxidised fat obtained in step (a) exceeds 0.01. The peroxide value indicates the amount of peroxides present in the fat and is expressed in milli-equivalent oxygen per kg fat. The way in which the peroxide value can be determined is described by P. G. Powick, J. Agric. Res. 26, 323 (1923).

In accordance with another preferred embodiment of the present process, step (a) involves oxidising the fat to such a degree that the anisidine value of the fat is increased by at least a factor 1.5, more preferably by at least a factor 2. According to a very preferred embodiment of the invention the anisidine value of the fat is increased by at least a factor 5 through the mild oxidation of step (a).

The terms fat and oil are used interchangeably in this document. The term fat as used here encompasses any triglyceride fat, including milk fat, animal fats and vegetable fats. The term triglyceride fat encompasses fats essentially consisting of triglycerides. The triglyceride fats used in the present process can suitably contain minor amounts of, for instance, diglycerides, monoglycerides and free fatty acids. Preferably the triglyceride fat used in the present process comprises at least 75 wt. %, more preferably at least 90 wt. % triglycerides.

We have found it beneficial to include a slight amount of hydrolysed fat into the triglyceride fat so as to catalyse the heat-hydrolysis. Generally not more than 25% of hydrolysed fat by weight of triglyceride fat should be included.

Examples of animal fats that can be utilised in the present process are chicken fat, salmon oil, lard and tallow. Also vegetable fats like peanut oil, sesame oil, cocoa butter and olive oil can be used in the present process. Even refined, essentially flavourless oils may successfully be utilised in the present process as flavour compounds are generated during the process. According to a very preferred embodiment of the present invention the triglyceride fat used in the present process comprises at least 50 wt. % milk fat. The term milk fat as used encompasses any triglyceride fat of dairy origin, e.g. fat present in butter, cream and whole milk.

According to a preferred embodiment of the invention, in step (a) a fat-containing composition is employed, containing at least 10 wt. % fat, more preferably containing at least 30 wt. % fat. Most preferably the fat-containing composition contains at least 60 wt. % fat.

Preferably in step (a) the fat is oxidised in the presence of at least 0.1% water by weight of the fat. Normally not more than 20% water by weight of fat is utilised. According to a very preferred embodiment the fat is oxidised in the presence of at least 0.2 wt. % water, more preferably even more than 0.5 wt. % water.

According to another preferred embodiment the triglyceride fat is oxidised in the presence of a metal salt, preferably a metal salt selected from the group consisting of alkali metal salts, alkaline earth metal salts and mixtures thereof. Most preferably the metal salt used in the present process is selected from the group consisting of sodium salt, potassium salt and mixtures thereof. The presence of a salt in the water present in the fat-containing composition has a favourable effect on rate of oxidation. Preferably the triglyceride fat is oxidised in the presence of at least 1%, more preferably 3-40% of metal salt by weight of the water present.

According to a preferred embodiment of the present invention the mild oxidation is carried out in the presence of an anti-oxidant. Preferably step (a) of the present process comprises the steps of (i) adding anti-oxidant to a fat-containing composition at a concentration level, calculated on the fat, of at least c* and (ii) keeping the composition, in the presence of water, at a temperature of more than 50° C. and at most the boiling temperature of the water under the conditions applied, during a period of time ranging from 0.5 hours to 1 week. Reference is made to the co-pending not prior published European patent application 89203218.6 (publication number EP-A-337.239), wherein c* is defined and wherein suitable anti-oxidants are mentioned.

According to another preferred embodiment of the invention, in step (a) the fat is oxidised by maintaining it at a temperature of at least 50° C. for more than 30 minutes. More preferably the fat is maintained at a temperature of at least 50° C. for more than 1 hour. Best results are obtained if the fat is maintained at a temperature of more than 70° C. for more than 1 hour.

It should be realised that steps (a) and (b) of the present process can suitably be combined. For example, the present invention encompasses a process wherein the triglyceride fat is subjected to a heat hydrolysis under oxidative conditions resulting in simultaneous oxidation and hydrolysis. The present invention, does not encompass a process in which step (a) is carried out after step (b). According to a very preferred embodiment of the invention steps (a) and (b) are carried out subsequently.

The hydrolysis of the triglyceride fat in accordance with the present process is preferably effected by maintaining said fat at a temperature above 110° C., more preferably above 130° C. According to yet another preferred embodiment hydrolysis is effected under increased pressure, i.e. a pressure exceeding 1.5 bar. Very good results are obtained if hydrolysis is effected at a pressure which is at least as high as the steam pressure (at equilibrium in a closed system) at the hydrolysis temperature.

In particular if high temperatures and pressures are applied, the presence of oxygen may result in excessive oxidation of the fat, resulting in the generation of off-flavours. Therefore, in a preferred embodiment of the invention hydrolysis is carried out in the presence of a gas phase containing less than 5 wt. %, more preferably less than 3 wt. % oxygen.

In general, a degree of hydrolysis exceeding 10% can be achieved within 10 hours. Normally the time required to obtain a particular degree of hydrolysis is proportional to the hydrolysis temperature and pressure applied. Preferably in the present process a degree of hydrolysis exceeding 10% is achieved within 3 hours.

According to a very preferred embodiment of the invention the degree of hydrolysis obtained in the process exceeds 25%. Preferably the latter degree of hydrolysis is accomplished within 10 hours.

The amount of hydrolysis obtained is largely determined by the amount of water present. A satisfactory degree of hydrolysis can only be obtained in the presence of a sufficient amount of water. Preferably hydrolysis is initiated, starting from a composition containing at least 1% water by weight of the triglyceride fat. More preferably the latter composition contains at least 2% water by weight of the triglyceride fat.

In order to avoid loss of volatile flavour compound and/or evaporation of water it can be beneficial to carry out the oxidation and/or hydrolysis in a closed system. Here the term closed system includes reflux and distillation systems.

Another aspect of the present invention relates to the use of a flavour concentrate obtained by the present process for flavouring food products. Examples of food products which can suitably be flavoured by means of a flavour concentrate prepared on the basis of butterfat are: spreads, bakery products, non-diary creams, ice cream, sweets etc. Flavour concentrates prepared on the basis of chicken fat, tallow and/or lard can suitably be used to flavour shortenings, frying fats, soups, sauces etc.

The flavour concentrates obtained by the present process are particularly useful for flavouring food products containing at least 10 wt. % fat. More preferably the flavour concentrate is used for flavouring food products containing at least 20 wt. % fat.

According to another preferred embodiment the flavour concentrate is added to the food product at a concentration level exceeding 50 ppm. More preferably the flavour concentrate is added at a concentration level within the range of 0.01% to 1.0% by weight of the food product.

The invention is illustrated by means of the following Examples:

EXAMPLE 1

1.4 kg butterfat ex Frico, the Netherlands, to which 286 ppm of a mixed tocopherol composition (ex Riken Vitamin co. Ltd., 70% in oil) had been added, was melted with the aid of a microwave oven. c° for the combination of butterfat and tocopherol used, was found to be about 20 ppm. 350 g of a 16% (w/w) salt solution, made using demineralized water, was added to the butterfat. The emulsion was heated to and maintained at 95° C. under continuous stirring in a 3-necked round-bottomed flask equipped with a reflux condenser. After 16 hours, the salty solution was seperated from the butterfat with the aid of a centrifuge.

1315 g of the oxidised butterfat was combined with 95.2 g water and 49 g hydrolysed butterfat (degree of hydrolysis 48%). The mixture so obtained was put in an autoclave which was subsequently blown through with nitrogen gas. The mixture was heated to a temperature of 180° C. in 60 minutes while stirring at 500 rpm. The temperature was maintained at 180° C. for 10 hours under continuous stirring. Then the temperature was decreased to 80° C., the product was drawn off and dried in a Rotavapor ™ at 70° C. The fatty composition so obtained was found to have been hydrolysed to a degree of 52%.

The flavour concentrate so obtained was used in the preparation of a bakery margarine of the following composition, having a flavour concentrate level of 500 ppm:

| Fat phase | |
| --- | --- |
| Fat[1] + flavour concentrate | 82.7 |
| Lecithin | 0.15 |
| Monoglyceride[2] | 0.15 |
| Beta carotene (0.4% solution) | 0.10 |
| Aqueous phase | |
| Water | 16.1 |
| Skim milk powder | 0.50 |
| Salt | 0.30 |
| Lactic acid to pH of | 4.5 |

[1] fat phase as in commercial bakery margarine (TRIO CREME ™, Bakkerol, Rotterdam, the Netherlands)
[2] Admul 6203 ™

The bakery margarine product of the above composition was used to prepare a dough comprising 40 parts of said margarine, 24 parts water and 40 parts flour. The dough so prepared was put into a refrigerator for about 15 minutes. Subsequently the cooled dough is turned into a puff pastry through the inclusion of further 60 parts of the above margarine product, and repeated rolling and folding. In between the rolling and folding the dough is repeatedly stored in the refrigerator for 20 minutes. The dough so obtained is cut into stalks of 1×1×7 cm. The stalks were again kept in the refrigerator for 20 minutes before they were baked at 185° C. for 25 minutes.

In the same way baked stalks were prepared from a dough containing a bakery margarine which had the same composition as the product described above, with the exception that it contained non-oxidised hydrolysed butter fat (degree of hydrolysis 52%). The baked stalks were evaluated by an expert panel. The stalks comprising the oxidised/hydrolysed butterfat were found to have a sweeter taste and more intense flavour than the stalks comprising non-oxidised hydrolysed butterfat. Furthermore the panel members were of the opinion that the former stalks to had a longer lasting after-taste.

Also margarine products themselves were evaluated by the panel.

The product containing the non-oxidised flavour concentrate was found to have a sharp cheesy flavour. The product containing the hydrolysed oxidised butterfat was found to have a more rounded off taste and a longer creamy after-taste.

Furthermore a margarine product was made with exactly the same composition as described hereinbefore, except that the flavour concentrate included (500 ppm) consisted of oxidised butterfat (prepared in the manner described above) which had not been subjected to a further hydrolysis. The margarine product so obtained hardly displayed a perceptible taste.

EXAMPLE 2

A flavour concentrate similar to that of Example 1 was added at a level of 2000 ppm to the following composition:

| Fat phase | |
| --- | --- |
| Fat[1] + flavour concentrate | 82.7 |
| Lecithin | 0.15 |
| Monoglyceride[2] | 0.15 |
| Beta-carotene (0.4% solution) | 0.10 |
| Aqueous phase | |
| Water | 15.9 |
| Salt | 1.0 |
| Lactic acid to pH of | 4.3 |

[1] fat phase as in commercial bakery margarine (TRIO KORST ™, Bakkerol, Rotterdam, the Netherlands)
[2] Admul 6203 ™

The bakery margarine product of the above composition was used to prepare a croissant (composition 13 parts of water, 45 parts flour, 22 parts margarine, 10 parts of milk, additional salt, yeast and egg). The normal procedure for croissants making was performed. When comparing this product (1) with products that contained instead of the 2000 ppm flavour concentrate as described in example 1, 2000 ppm of non-oxidised hydrolysed butterfat (2), 2000 ppm of oxidised but non-hydrolysed butterfat (3) and 2000 ppm untreated butterfat (4) the following statements were made by experts:

Product (1) has a superior rounded-off, cheese-like taste and smell, product 2 has a rather pungent taste and smell. Product 3 has a rounded off-taste and product 4 has the least quality.

We claim:

1. Process for preparing a flavour concentrate, comprising the steps of:
   (a) mildly oxidising triglyceride fat, which comprises at least 50 wt. % milk fat, to such a degree that the ratio of the anisidine value and the iodine value obtained exceeds 0.05, wherein the fat is oxidized by maintaining it at a temperature of at least 50° C. for more than 30 minutes, and
   (b) hydrolysing the triglyceride fat in the presence of water at increased temperature of above 110° C. and/or increased pressure exceeding 1.5 bar during a period of time sufficient to obtain a degree of hydrolysis exceeding 10%,
wherein step (a) is carried out prior to or simultaneously with step (b).

2. Process according to claim 1, wherein step (a) involves oxidizing the fat to such a degree that the anisidine value of the fat is increased by at least a factor 1.5.

3. Process according to claim 1, wherein the step (a) the fat is oxidized in the presence of at least 0.1%, preferably at least 0.2% water by weight of the fat.

4. Process according to claim 1, wherein the hydrolysis of the triglyceride fat is effected by maintaining said fat at a temperature above 130° C.

5. Process according to claim 1, wherein the hydrolysis is carried out in the presence of a gas phase containing less than 5 wt. % of oxygen.

6. Process according to claim 1, wherein the hydrolysis is initiated starting from a composition containing at least 1% of water by weight of the triglyceride fat.

7. A method of flavoring food products comprising incorporating in the products the flavour concentrate obtained according to claim 1.

8. The method according to claim 7 wherein the flavour concentrate is incorporated in the food products at a concentration in the range of 0.01% to 1.0% by weight of the food product.

* * * * *